July 23, 1935.  F. H. LOFTUS  2,009,236
REGENERATIVE FURNACE
Filed June 25, 1934  2 Sheets-Sheet 1
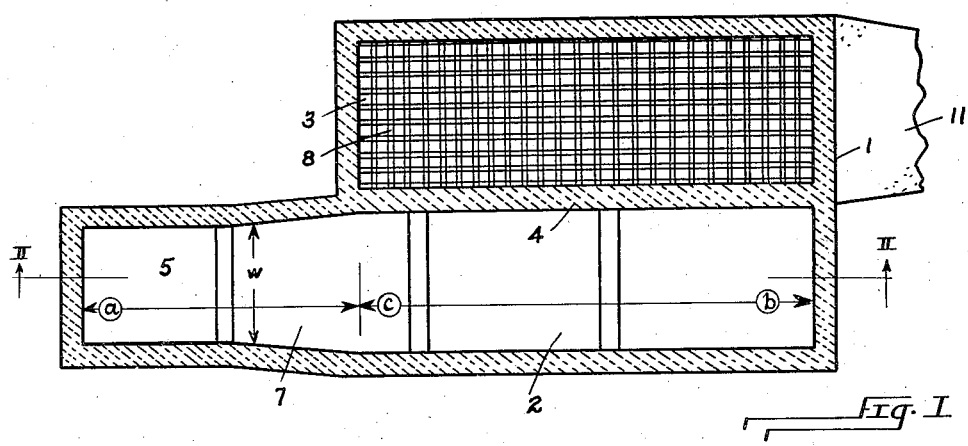
Fig. I
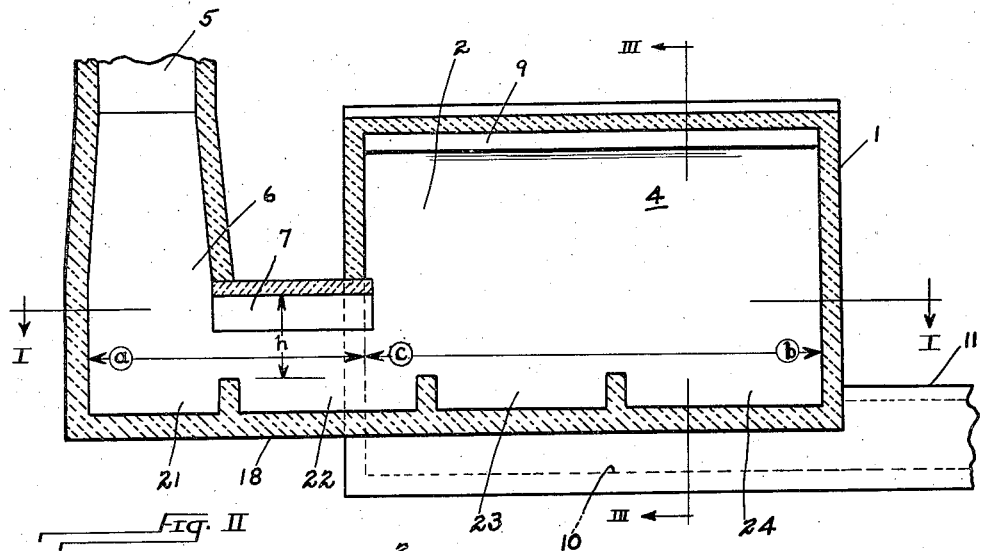
Fig. II
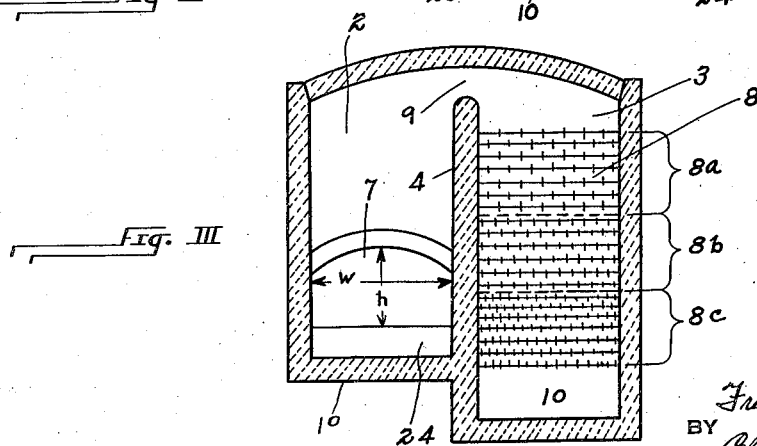
Fig. III
INVENTOR
Fred H. Loftus
BY
ATTORNEYS July 23, 1935.　　　　F. H. LOFTUS　　　　2,009,236
REGENERATIVE FURNACE
Filed June 25, 1934　　　2 Sheets-Sheet 2
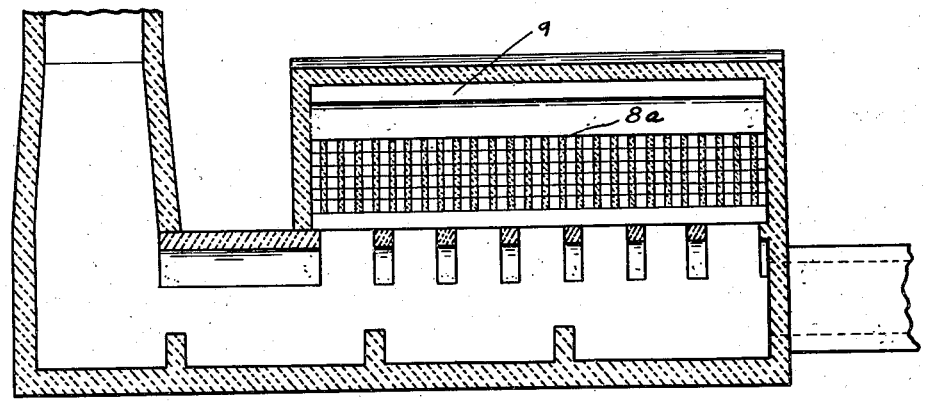
Fig. IV
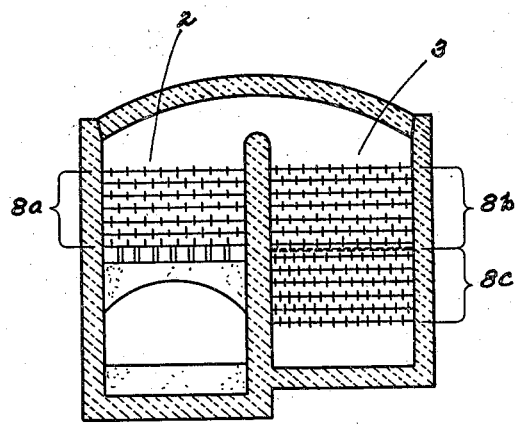
Fig. V
INVENTOR
Fred H. Loftus
BY Christy and Wharton
ATTORNEYS Patented July 23, 1935

2,009,236

UNITED STATES PATENT OFFICE 2,009,236

REGENERATIVE FURNACE

Fred H. Loftus, Pittsburgh, Pa.

Application June 25, 1934, Serial No. 732,195

2 Claims. (Cl. 263—19)

My invention relates to regenerative furnaces, and particularly to a regenerator structure for open-hearth furnaces. The regenerator may be employed with advantage in any type of open-hearth furnace, and is particularly valuable in a furnace of the type which is fired with liquid fuel. In exemplary way, I shall describe the invention as it is applied to a furnace of the latter type.

Characteristically a regenerator comprises one or more bodies of checkerwork which are heated by the hot waste gases of the furnace, and, alternately, are caused to heat the air for combustion in the furnace. In practice the high velocity and temperature of the liquid fuel flame results in the production of a great deal of dust and slag within the furnace, and it has been found that as many as twelve pounds of dust per ton of steel output are produced, while fused particles of slag are produced in amounts upward of one-twentieth of a cubic foot per ton of steel. The waste gases carry these dust and slag particles from the outgo port of the furnace and into the regenerator associated therewith, whereby the passages of the checkerwork are clogged, rendering it impossible to maintain the proper ratio between the area of openings and the area of the exposed refractory surfaces in the checkerwork.

The slag particles and some of the larger dust particles in the waste gases follow the laws of gravity; that is, they may be precipitated out of the gases by the normal action of gravity, which produces an acceleration of 32.16 feet per second.

Ordinarily, slag pockets or separating chambers are provided in the path of the waste gases flowing to the regenerator, and such means have proved effective in cleansing the gases of the slag particles and of the larger dust particles which behave in accordance with the laws of gravity. However, the smaller dust particles, which are largely composed of iron oxide, do not follow the laws of gravity, but tend at constant velocity to settle out of the streaming waste gases. Accordingly, the usual slag pockets and centrifugal separating chambers are ineffective to remove this fine dust. The dust enters the regenerator; the iron oxide particles attack the checkerwork, and cause clogging of the passages.

My invention comprises a specialized regenerator structure which, in conjunction with an accompanying specialized organization of slag pocket, is effective in cleansing the waste gases of the so-called constant velocity dust particles, together with the dust and slag particles which follow the laws of gravity.

In the accompanying drawings Fig. I is a view in horizontal section of my regenerator, taken on the plane I—I of Fig. II; Fig. II is a view in vertical section, taken on the plane II—II of Fig. I; Fig. III is a view of the regenerator in cross-section, taken on the plane III—III of Fig. II; and Figs. IV and V are views comparable with Figs. II and III, respectively, illustrating a modification.

My regenerator comprises a chamber 1 which includes a plurality of compartments—in this case two elongate compartments 2 and 3 arranged side-by-side and separated by a vertical wall 4 extending longitudinally of the compartments. The reference numeral 5 indicates the downtake through which the waste gases stream at relatively high velocities from the outgo port of the furnace (not shown); 6 indicates the slag pocket with which the downtake communicates; and 7 indicates the passage by means of which the slag pocket communicates with the regenerator. It will be understood that the walls of regenerator, slag pocket, and passages are constructed of refractory brick, and are well insulated in accordance with good practice, to insure that the waste gases reach the regenerator at a temperature of from 2500 to 2600 degrees F.

In accordance with my invention, I provide an elongate, substantially horizontal settling chamber through which the waste gases must pass before entering the checkerwork of the regenerator, and this chamber is of such cross-sectional area with respect to the quantity of waste gases delivered by the furnace that the waste gases flow therethrough at relatively low velocities, whereby the so-called constant velocity dust particles are given sufficient time in which to traverse the stream of gases downwardly, and settle upon the floor of the passage. The slag pocket 6, passage 7, and compartment 2 are so relatively disposed and proportioned that together they provide the elongate, substantially horizontal settling chamber.

The settling chamber in length extends between the points $a$ and $b$ (Figs. I and II), and the height $h$ and width $w$ of passage 7 defines, substantially, the effective height and width of the settling chamber. Upon emerging from the downtake 5, the waste gases flow angularly to the vertical, between points $a$ and $b$, and during such prolonged, substantially horizontal flow the constant-velocity dust particles have sufficient time in which to settle to the floor 18.

In a typical installation, the waste gases enter the slag chamber 6 at a velocity of 30 feet a second; the slag chamber and passage 7 are constructed with such cross-sectional areas that the average velocity of the gases flowing between points $a$ and $b$ is ten feet a second or less; the height $h$ of the stream of gases is nine feet, the width $w$ is eleven feet, and the distance from $a$ to $b$ is fifty-seven feet. In such structure substantially all dust particles above 100 microns in size are removed from the gases. Of course (in accordance with usual practice) the heavier slag and dust particles are removed from the gases in chamber 6.

As Figs. I–III of the drawings illustrate, the chamber 2 of the regenerator includes no checkwork, whereby it admits of an unrestricted sweep of the waste gases into the regenerator. The usual heat-exchanging refractories comprise a body of checkerwork 8 included in the chamber 3, or in other chambers beyond the chamber 2. Between the settling chamber ($a$, $b$, $h$, $w$) and the checkerwork 8, I provide a constricted passageway. In this case I provide an elongate orifice 9 in or about the partition 4; the orifice 9 is so disposed that the constricted flow of the gases progresses transversely of the regenerator, and in this case across the top of checkerwork 8. In any case, it seems essential to cause a constricted flow between the settling chamber and the main body of checkerwork in the regenerator, and it seems desirable that such flow should be directed transversely of the course in which the gases move between the points $c$ and $b$ (Fig. II).

The constricted flow through orifice 9 tends to insure uniform distribution of the gases over the face of checkerwork. The gases flow downward through the checkerwork 8 and enter a passageway 10, whence they flow into a duct 11, communicating (through the usual reversing valves) with the furnace stack (not shown). Both reception and delivery of the gases are at the bottom of the regenerator, and flow from the settling chamber to the main body of checkerwork occurs transversely of the regenerator.

When the furnace is reversed, the regenerator is employed to preheat air for combustion in the furnace. The air enters regenerator compartment 3 by way of duct 11; from passageway 10 the air flows upward through the hot checkerwork 8 and is heated thereby; upon issuing from the top of the checkerwork, the air enters the settling chamber ($a$, $b$, $h$, $w$), whence it flows upward through uptake 5 and into the furnace, is being understood that upon furnace reversal the downtake (5) becomes the uptake.

Advantageously, I provide in the floor of the settling chamber a series of pockets 21, 22, 23, 24. The slag and dust particles, following the laws of gravity, are deposited in pocket 21—some may follow through to pocket 22—while the constant-velocity dust particles are deposited in pockets 23 and 24—and to some extent in pocket 22. My structure affords a maximum of available storage space for slag and dust, whereby an open-hearth furnace may be operated for its full campaign, without shutting down, to admit of the usual removal of slag from the slag pockets.

Advantageously all of the checkerwork 8 is included in the compartment 3. The compartment 3 may be of greater depth than compartment 2, as shown in Fig. III, to permit an adequate mass of checkerwork tiles to be installed. While I refer to the checkerwork in compartment 3 as the main body of checkerwork, I contemplate that it may comprise several supposed bodies 8$a$, 8$b$, 8$c$ of checkerwork. The vertical passages for gaseous flow through these bodies may be varied; that is, the passages in body 8$a$ may be larger than the passages in body 8$b$, and the passages in body 8$b$ may in turn be larger than those in body 8$c$. Such checkerwork structure tends to hold constant the velocity of the waste gases moving downward (cooling and contracting on their way) through the checkerwork 8. Alternately, the velocity of the air flowing upward through the checkerwork, absorbing heat and expanding as it flows, tends to remain constant.

It will be understood that a third regenerator compartment may be organized to receive the waste gases as they flow from compartment 3; the third compartment may embody part of the checkerwork shown in compartment 3, and may embody an additional body of checkerwork. The art is well acquainted with the manner in which two, and even three, checkerwork compartments may be organized in series or in tandem, and it is deemed unnecessary to illustrate the structure. Indeed, in some cases I propose to install a relatively shallow body of checkerwork in compartment 2, between the settling chamber $a$, $b$, $h$, $w$ and the orifice or constricted passage 9. As shown in Figs. IV and V, this shallow body of checkerwork may comprise the body 8$a$, which in Fig. III is shown to comprise the uppermost of the several checkerwork bodies 8$a$, 8$b$, 8$c$ in compartment 3. In any case, any checkerwork which may be included in compartment 2 must be so disposed and organized in the compartment as not to destroy or appreciably impair the capacity of the elongate passage $a$, $b$, $h$, $w$ as a settling chamber for the precipitation of constant-velocity dust particles from the waste gases.

I claim as my invention:

1. In combination with the downwardly-extending, waste gas duct of an open-hearth furnace, a slag chamber in communication with the lower end of said duct, said slag chamber being of large cross-section relatively to said duct, whereby waste gases entering said slag chamber from said duct flow at reduced velocities, a regenerator including a plurality of compartments extending side-by-side and at least one of said compartments including a body of checkerwork, and a passageway extending laterally of said slag pocket and communicating with said regenerator; said slag chamber, said passageway, and a compartment of said regenerator comprising together a settling chamber of such effective dimensions and disposition that waste gases streaming from said duct advance at relatively low velocities through a horizontally elongate course, to effect the "constant velocity" precipitation of dust particles included with said waste gases, and a flow-accelerating passage extending laterally of such settling chamber for the introduction of the waste gases in cleansed condition to another of said regenerator compartments.

2. The structure of the next preceding claim, in which said slag chamber, said passageway, and the first-mentioned compartment of said regenerator, collectively considered, extend in substantially horizontal direction, and provide a settling chamber of large cross-sectional area relatively to said furnace duct.

FRED H. LOFTUS.